(12) United States Patent
Song et al.

(10) Patent No.: US 10,798,110 B2
(45) Date of Patent: *Oct. 6, 2020

(54) METHOD AND SYSTEM FOR IDENTIFYING NETWORK LOOPS

(71) Applicant: Alibaba Group Holding Limited, George Town (KY)

(72) Inventors: Yangyang Song, Hangzhou (CN); Lele Ma, Hangzhou (CN); Min Hu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,438

(22) Filed: Feb. 6, 2019

(65) Prior Publication Data

US 2019/0190924 A1 Jun. 20, 2019

Related U.S. Application Data

(63) Continuation of application No. 15/246,000, filed on Aug. 24, 2016, now Pat. No. 10,243,969.

(30) Foreign Application Priority Data

Sep. 23, 2015 (CN) .......................... 2015 1 0612181

(51) Int. Cl.
*H04L 29/06* (2006.01)
*H04L 29/12* (2006.01)
(Continued)

(52) U.S. Cl.
CPC .......... *H04L 63/1408* (2013.01); *H04L 63/02* (2013.01); *H04L 63/1416* (2013.01);
(Continued)

(58) Field of Classification Search
CPC ............. H04L 63/1408; H04L 63/1416; H04L 63/1425; H04L 63/02; H04L 63/1458;
(Continued)

(56) References Cited

U.S. PATENT DOCUMENTS 6,717,922 B2 4/2004 Hsu
7,069,480 B1 6/2006 Lovy
(Continued)

FOREIGN PATENT DOCUMENTS

CN 102916850 2/2013
WO 2004070509 8/2004

OTHER PUBLICATIONS

Rong Li, Dissertation for Master's Degree in Engineering Method for Monitoring and Controlling Network Traffic: Design and Implementation, Mar. 7, 2012, Beijing University of Posts and Telecommunications.
(Continued)

*Primary Examiner* — Cheng-Feng Huang
(74) *Attorney, Agent, or Firm* — Van Pelt, Yi & James LLP

(57) ABSTRACT

Identifying network loops is disclosed including determining a first data packet having a time to live (TTL) that at least meets a first condition, the first data packet having a destination internet protocol (IP) address; within a time period after the determining of the first data packet, identifying a plurality of second data packets that are to be transmitted to the destination IP address; and determining whether a network loop exists for the destination IP address based on TTLs of the plurality of second data packets.

16 Claims, 10 Drawing Sheets

(51) Int. Cl.
*H04L 12/733* (2013.01)
*H04L 12/705* (2013.01)

(52) U.S. Cl.
CPC ...... *H04L 63/1425* (2013.01); *H04L 63/1458* (2013.01); *H04L 45/18* (2013.01); *H04L 45/20* (2013.01); *H04L 61/1511* (2013.01); *H04L 61/2076* (2013.01); *H04L 69/22* (2013.01)

(58) Field of Classification Search
CPC ......... H04L 69/22; H04L 45/20; H04L 45/18; H04L 61/2076; H04L 61/1511
See application file for complete search history.

(56) References Cited

U.S. PATENT DOCUMENTS

| | | |
|---|---|---|
| 7,154,861 B1 | 12/2006 | Merchant |
| 7,969,898 B1 | 6/2011 | Raj |
| 9,060,322 B2 | 6/2015 | Zou |
| 2006/0077964 A1 | 4/2006 | Wu |
| 2007/0230360 A1* | 10/2007 | Nishi ................ H04L 41/0677 370/249 |
| 2009/0161567 A1* | 6/2009 | Jayawardena ...... H04L 63/1441 370/252 |
| 2009/0320131 A1* | 12/2009 | Huang ................ H04L 61/2076 726/23 |
| 2010/0242113 A1 | 9/2010 | Jayawardena |
| 2011/0280145 A1* | 11/2011 | Itoh ........................ H04L 12/42 370/252 |
| 2012/0240185 A1 | 9/2012 | Kapoor |
| 2013/0322444 A1 | 12/2013 | Ossipov |
| 2015/0082431 A1* | 3/2015 | Davis ................ H04L 63/1425 726/23 |
| 2015/0124587 A1* | 5/2015 | Pani ........................ H04L 41/12 370/221 |
| 2016/0344765 A1* | 11/2016 | Shiell ................ H04L 63/1458 |

OTHER PUBLICATIONS

Wang Jia, Master's Dissertation Expert System-Based Network Fault Detection Method: Research and Implementation, Mar. 3, 2011, University of Electronic Science and Technology of China.

* cited by examiner

1000

200

METHOD AND SYSTEM FOR IDENTIFYING NETWORK LOOPS

CROSS REFERENCE TO OTHER APPLICATIONS

This application is a continuation of co-pending U.S. patent application Ser. No. 15/246,000, entitled METHOD AND SYSTEM FOR IDENTIFYING NETWORK LOOPS filed Aug. 24, 2016 which is incorporated herein by reference for all purposes, which claims priority to People's Republic of China Patent Application No. 201510612181.8, entitled A METHOD, DEVICE, TRAFFIC CLEANING EQUIPMENT AND SYSTEM FOR IDENTIFYING NETWORK LOOPS filed Sep. 23, 2015 which is incorporated herein by reference for all purposes.

FIELD OF THE INVENTION

The present application relates to a method and system for identifying network loops.

BACKGROUND OF THE INVENTION

As networks have developed, the volume of attack traffic on the networks has also increased. The attack traffic (e.g., packets relating to distributed denial of service (DDoS) attacks) is aimed at disrupting the normal operations of networks. In a bypass mode, routers use dynamic routing such as static routing and border gateway protocol (BGP) routing to dynamically direct traffic to network cleaning equipment that cleans distributed denial of service (DDoS) attacks, and then the DDoS cleaning equipment uses various traffic injection techniques to reinject cleaned traffic into the network traffic. However, the DDoS cleaning equipment in in-path mode, out-of-path mode, or diversion mode can lead to internet protocol (IP) address errors due to policy-based routing configuration errors, thereby resulting in the existence of a loop in the network, which can then make the network unusable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
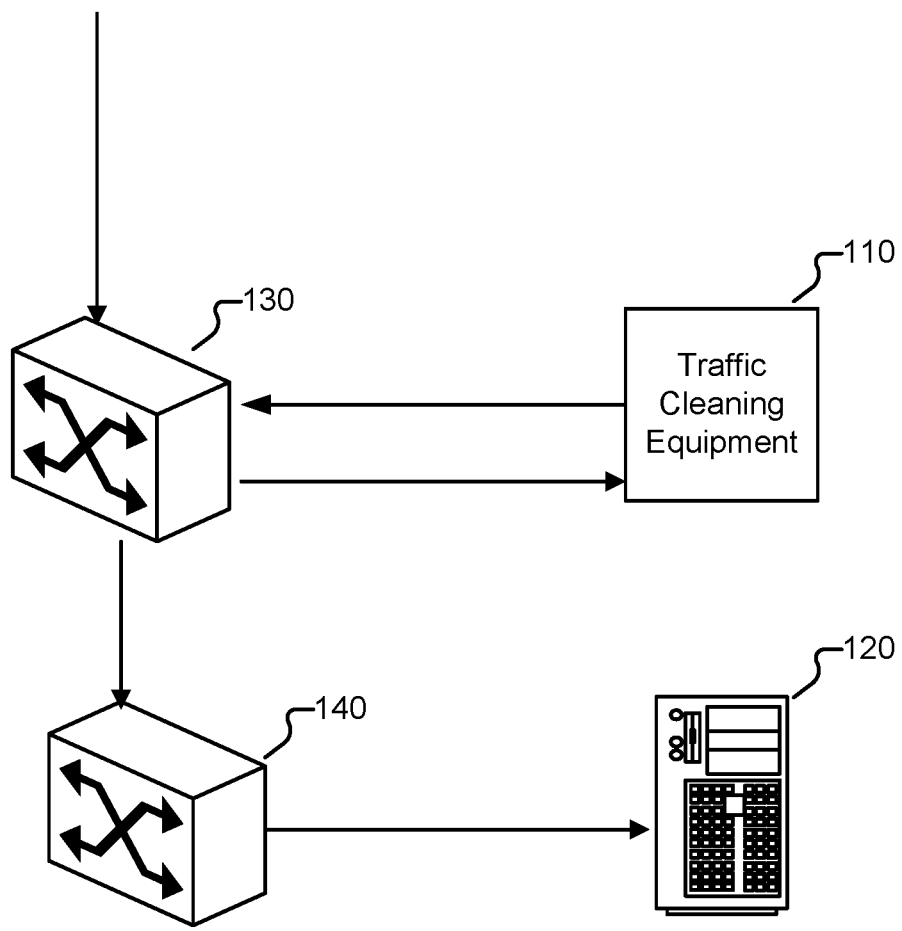
FIG. 1A is a schematic diagram of an embodiment of a network architecture for identifying network loops.

FIG. 1A is a schematic diagram of an embodiment of a network architecture that can form network loops. In the network architecture 100 of FIG. 1A, a traffic cleaning equipment 110 is located near a server 120. In some embodiments, the traffic cleaning equipment 100 is also known as a DDOS mitigation appliance, which is used for mitigating DDOS attacks. The traffic cleaning equipment 110 is a network device that can analyze network traffic and differentiate attack traffic and normal traffic. Similar to a firewall, the traffic cleaning equipment 110 discards the attack traffic, and releases the normal traffic. A network loop can occur during bypass in the following scenario: a router 130 diverts traffic from router 130 to the traffic cleaning equipment 110 based on a BGP protocol; in the event that the traffic cleaning equipment 110 has finished cleaning the traffic, the traffic cleaning equipment 110 injects the traffic back into router 130; at this time, router 130 should be directing the cleaned traffic toward router 140 directly to configure policy-based routing (PBR) and thus avoiding repetitive diversion; however, in the event of a PBR configuration error where traffic is not directed to router 140, a loop will exist in the network between router 130 and traffic cleaning equipment 110, which causes the network to be unusable. A network loop or routing loop is formed when an error occurs in the operation of the routing algorithm or due to faulty configuration settings, and as a result, in a group of nodes, the path to a particular destination forms a loop.

Figure 1B:
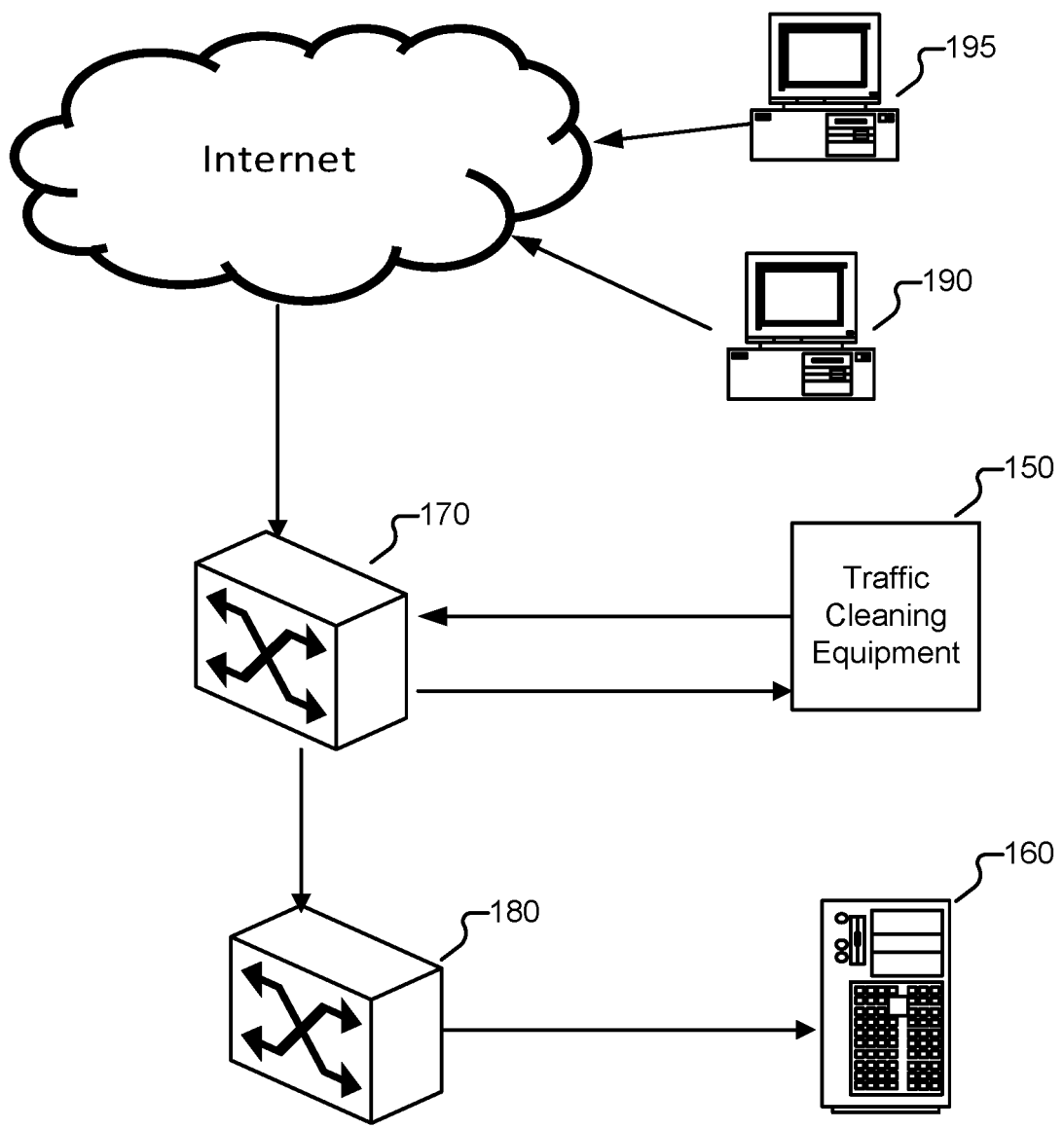
FIG. 1B is a schematic diagram of another embodiment of a network architecture that can form network loops.

FIG. 1B is a schematic diagram of another embodiment of a network architecture that can form network loops. In the network architecture 1000 depicted in FIG. 1B, a traffic cleaning equipment 150 is located near a server 160. A network loop can occur during bypass in the following scenario: destinations of traffic pulled by the traffic cleaning equipment 150 are external IP addresses; for example, a device 190 associated with an IP address IPA (e.g., 192.168.1.1) attempts to use the server 160 to access another device 195 on the Internet that has the IP address of IPB, thus during normal operation, a router 170 is to divert traffic originating from IPA and destined for IPB (e.g., 192.168.1.2). In the event of an attack detection error, the traffic originating from the IP address of IPA is pulled to the traffic cleaning equipment 150, then the traffic that has been cleaned by the traffic cleaning equipment 150 passes through PBR, and is directed to a router 180. In the event that the router 180 discovers that the source address is the IP address that corresponds to the IP address of IPA, the router 180 is to continue to direct the traffic to the router 170, and the traffic from the IP address of IPA is again sent to traffic cleaning equipment 150, thereby creating another loop to cause the network to be unusable.

Network loops that exist in the network architectures depicted in FIGS. 1A and 1B can be identified. For example, in FIGS. 1A and 1B, the traffic cleaning equipment 110 (or the traffic cleaning equipment 150) identifies Time To Live (TTL)=0 for data packets in the traffic pulled from router 130 (or, identifies TTL=0 data packets in the traffic pulled from router 170), records the destination IP addresses of the TTL=0 data packets, tracks changes in the TTLs of the data packets that are to be transmitted to the destination IP address, and in the event that the router discovers that a reduction in TTL exists for the same data packet in the traffic cleaning equipment 110 (or the traffic cleaning equipment 150), the router then determines that a network loop exists for the destination IP address. In some embodiments, the value of the decrease in TTL in each loop can vary depending on the network architecture. In FIG. 1A, because the traffic cleaning equipment 110 is installed next to the server 120 near a destination, the network loop exists between router 130 and the traffic cleaning equipment 110. Therefore, after the same data packet passes through router 130, the TTL value of the data packet is reduced by one interval, and the data packet is again diverted to the traffic cleaning equipment 110. In FIG. 1B, because the traffic cleaning equipment 150 is installed next to the server 160 near the source, the network loop exists between router 170, router 180, and the traffic cleaning equipment 150. Therefore, for example, after the same data packet passes through router 170 and router 180, the TTL value of the data packet is reduced by one interval each time for a total of two intervals, and the data packet is again pulled to the traffic cleaning equipment 150. The number of intervals reduced each time the data packet passes through a router can be any value and is not limited to one interval.

In addition, the time to live (TTL) field in data packets is to be first explained. The time to live (TTL) field is an 8-bit Internet Protocol version 4 (IPv4) packet field, which designates the maximum number of network segments the data packet can pass through before the router discards the data packet. The TTL value can be set by the sender of the data packet. Throughout the entire forwarding path of the data packet, each time the data packet passes through a router, the router revises the value of the TTL. For example, the router reduces the value of the TTL field by 1, then forwards the data packet out again. In the event that the TTL is reduced to 0 before the data packet reaches the destination IP, the router is to discard TTL=0 data packets received and transmit a control packet protocol (internet control packet protocol (ICMP)) time exceeded packet to the sender of the data packet.

Figure 2:
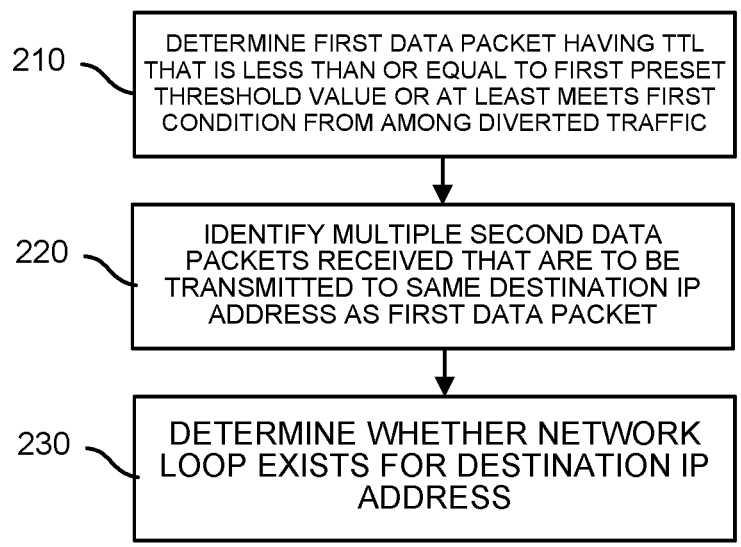
FIG. 2 is a schematic flow diagram of an embodiment of a process for identifying network loops.

FIG. 2 is a flowchart of an embodiment of a process for identifying network loops. In some embodiments, the process 200 is performed by a traffic cleaning equipment 110 of FIG. 1A or a traffic cleaning equipment 150 of FIG. 1B and comprises:

In 210, the traffic cleaning equipment determines a first data packet having a TTL that is less than or equal to a first preset threshold value or at least meets a first condition. The first data packet is obtained from among diverted traffic (specifically, traffic diverted by the router to the traffic cleaning equipment). The destination IP address of the first data packet is also determined.

In 220, within a first preset time period after determining the first data packet that has a TTL less than or equal to the first preset threshold or at least meets the first condition, the traffic cleaning equipment identifies multiple second data packets received that are to be transmitted to the same destination IP address as the first data packet.

In 230, the traffic cleaning equipment determines whether a network loop exists for the destination IP address based on the TTLs of the multiple second data packets.

In 210, the first preset threshold value can be a relatively small integer. For example, the first preset threshold value is 1 or 2, and the destination IP addresses that are to be monitored for the presence of network loops can be screened based on the TTL of the first network packet.

In some embodiments, in 220 and 230, the first set time period is set via configuration settings of the traffic cleaning equipment, and can be set by default or by a user. In some embodiments, in 220 and 230, the first set time period is set through experimentation. For example, the first set time period can be set to one second. In some embodiments, the magnitude of reductions in the TTLs of the data packets that are to be transmitted to the destination IP address is tabulated within the first set time period. For example, the magnitude of the reductions in the TTLs is 1 or any other value determined by the router after each loop. In the event that the TTL of the same second data packet is observed to decrease continuously within the first set time period, and the TTL decreases to less than a second preset threshold value during this first set time period, then an abnormality can be determined as being present in the destination IP address corresponding to the data packets. To determine whether an abnormality exists, the traffic cleaning equipment determines whether the data packet is the same or different based on a sequence (seq) number field in the data packet. Each data packet should have different seq numbers. If two data packets have the same seq number, two possibilities exist: the data packet has been retransmitted or the data packet is in a loop. For a retransmitted data packet, the retransmitted data packet should have the same TTL as the data packet, and a looped data packet would have a smaller TTL than the data packet. In the event that the abnormality is detected to exist in each of the multiple second data packets during this first time period, then a network loop can be determined as being present in the destination IP address.

As discussed above, based on a determination of a first data packet from among diverted network traffic having a TTL that is less than a first preset threshold value or at least meets a first condition, and the determination of the destination IP address of the first data packet, a determination can be made of whether a network loop exists for the destination IP address based on TTLs of multiple second data packets that are to be transmitted to the destination IP address, enabling the timely detection of network loops and a termination of the diversion of IP addresses for which network loops exist, and thereby preventing network loops from affecting network usability.

Figure 3:
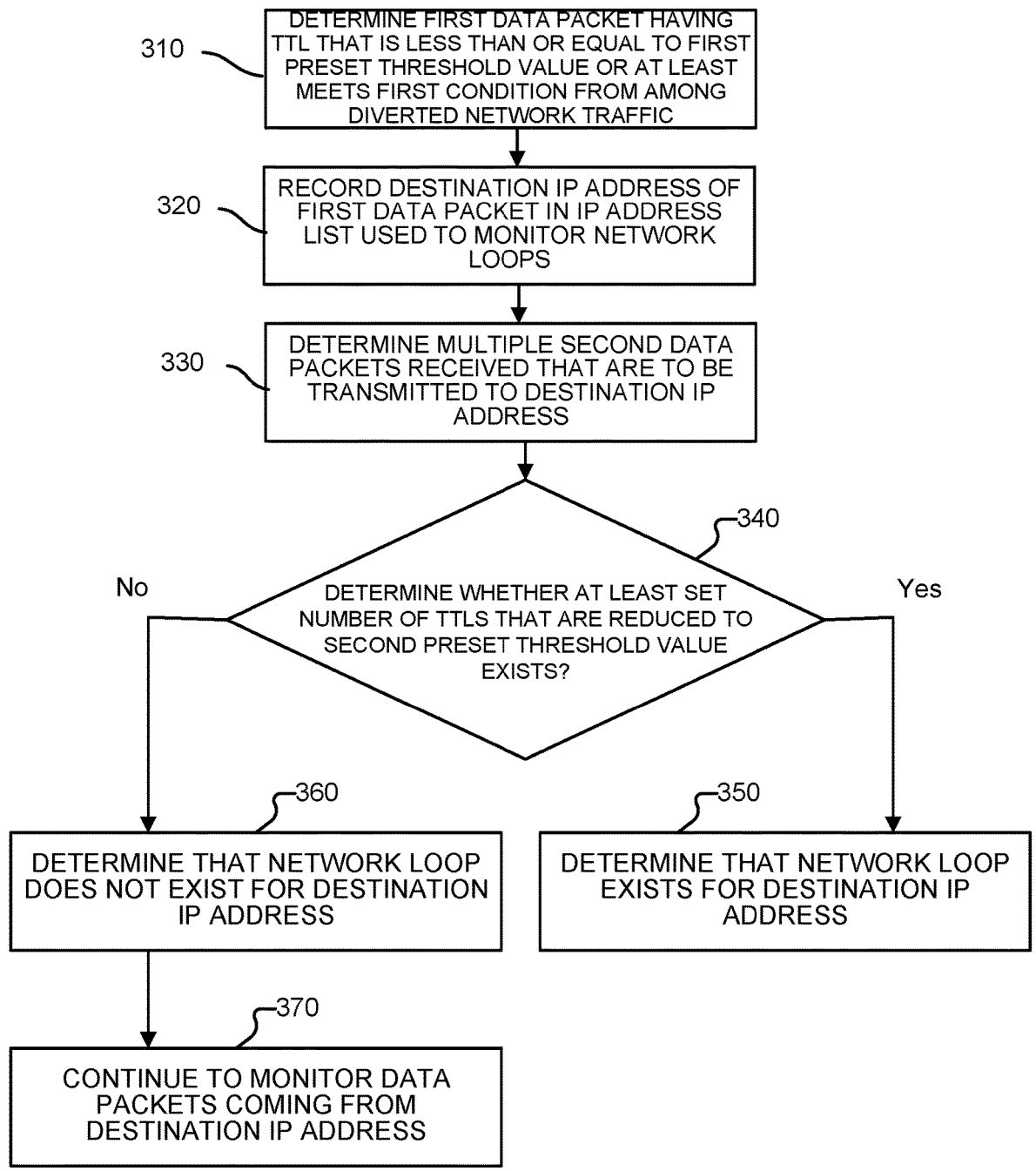
FIG. 3 is a schematic flow diagram of another embodiment of a process for identifying network loops.

FIG. 3 is a schematic flow diagram of another embodiment of a process for identifying network loops. In some embodiments, the process 300 is implemented by a traffic cleaning equipment 110 of FIG. 1A or a traffic cleaning equipment 150 of FIG. 1B and comprises:

In 310, the traffic cleaning equipment determines a first data packet having a TTL that is less than or equal to a first preset threshold value or at least meets a first condition from among diverted network traffic, and determines a destination IP address of the first data packet.

In 320, the traffic cleaning equipment records the destination IP address of the first data packet in an IP address list used to monitor network loops. In this example, the traffic cleaning equipment maintains the IP address list which tracks the destination IP addresses of packets, and examines the IP addresses of packets that are diverted to the traffic cleaning equipment. If a packet has a destination IP address that is not in the list, this packet is deemed to be a first data packet, and its destination IP address is recorded in the list.

In 330, within a first set time period after determining the destination IP address of the first data packet, the traffic cleaning equipment determines multiple second data packets received that are to be transmitted to the destination IP address. In this example, packets received at the cleaning equipment, having a corresponding destination IP address that matches a previously recorded destination IP address in the list, are identified as second data packets for that destination IP address.

In 340, for a given destination IP address, within the first set time period, the traffic cleaning equipment determines whether at least a set number of TTLs that are reduced to a second preset threshold value exists among the multiple TTLs corresponding to the multiple second data packets for the destination IP address. In other words, a set number of second data packets of the multiple second data packets in the same session have a reduced TTL. In the event that the set number of TTLs that are reduced to the second preset threshold value exists, control passes to 350; otherwise, in the event that the set number of TTLs that are reduced to the second preset threshold value does not exist, control passes to 360.

In 350, in the event that the set number of TTLs that are reduced to the second preset threshold value exists among the multiple TTLs corresponding to the multiple second data packets, the traffic cleaning equipment determines that a network loop exists for the destination IP address. For example after determining that a network loop exists, the network loop can be repaired after the traffic cleaning equipment stops packet diversion.

In 360, in the event that the set number of TTLs that are reduced to the second preset threshold value does not exist among the multiple TTLs corresponding to the multiple second data packets, the traffic cleaning equipment determines that a network loop does not exist for the destination IP address.

In 370, within a second set time period after determining that a network loop does not exist for the destination IP address, the traffic cleaning equipment continues to monitor data packets coming from the destination IP address. In some embodiments, the traffic cleaning equipment continues to monitor the data packets to determine whether the TTL continues to drop, rather than determining that a network loop exists after one drop to avoid misidentification of a network loop.

Because operations 310 and 330 of FIG. 3 correspond with operations 210 and 220 of FIG. 2, respectively, for further discussions of operations 310 and 330, please refer to the relevant descriptions of operations 210 and 220 of FIG. 2, respectively. Operations 310 and 330 of FIG. 3 will not be further discussed for conciseness.

In 320, in this example, the IP address list used to monitor network loops can be stored on the traffic cleaning equipment, thus enabling the traffic cleaning equipment to determine whether a destination IP address of the diverted traffic is present in the IP address list.

In 340, in this example, the set number of TTLs is set by the provider of the traffic cleaning equipment. The specific numerical value of the set number of TTLs is not limited by the application.

In 360 and 370, in this example, the monitoring of the destination IP address continues for a second preset time period without performing any processing of the destination IP address. Within the second set time period, in the event that the set number of TTLs does not exist, then the traffic cleaning equipment no longer monitors the destination IP address. After the second set time period, the traffic cleaning equipment will reset (e.g., removing the destination IP address from the list or resetting the list) and start to monitor the destination IP address again.

In one example, data packet A, data packet B, data packet C, and data packet D are to be diverted by the router to the traffic cleaning equipment. Suppose that the first preset threshold value is 1, and the TTLs of data packets A, B, C, and D are 0, 3, 4, and 5, respectively. Data packet A is thus the first data packet in this example. The destination IP address of data packet A is recorded, and the destination IP address is determined to be 1.1.1.1. Within one second after the destination IP address of data packet A is recorded, data packets detected that are to be transmitted to 1.1.1.1 (the destination IP address of data packet A) include data packet E, data packet F, and data packet G. Data packet E, data packet F, and data packet G correspond to second data packets. In this example, data packet E, data packet F, and data packet G come from different source IP addresses, and the TTLs of data packet E, data packet F, and data packet G are 128, 126, and 125, respectively. In the event that data packet E, data packet F, and data packet G are re-looped to the traffic cleaning equipment within the first set time period, then the TTLs of data packet E, data packet F, and data packet G become 127, 125, and 124, respectively; after multiple loops within the first set time period, the TTLs of data packet E, data packet F, and data packet G will continue to be reduced until the TTLs correspond to 0 or less than the second preset threshold value. In some embodiments, when the TTL reaches 0, the router will discard the data packet. When data packets E, F and G loop back to the traffic cleaning equipment, the traffic cleaning equipment is able to identify the data packets E, F and G rather than some other data packets using, for example, a lookup table to keep track of seq numbers. Upon the TTLs corresponding to 0 or being less than the second preset threshold value, a network loop can be determined to exist for the destination IP address 1.1.1.1.

In the event that a large number of data packets that are to be transmitted to 1.1.1.1. (e.g., 1,000 data packets) are detected, for example, 100 (the set number) data packets can be determined from among these 1,000 data packets with TTLs that continue to be reduced similarly to data packet E, data packet F, and data packet G, until the TTLs are reduced to 0 or less than a second preset threshold value. Upon being reduced to 0 or less than the second preset threshold value, a network loop can be determined to exist based on the TTLs of the 100 data packets.

By determining within a first set time period whether a set number of TTLs that are reduced to a second preset threshold value exists among the multiple TTLs corresponding to the multiple second data packets, the identification of destination IP addresses for which loops exist based on the magnitude of the reduction in the TTL substantially increases the flexibility of traffic cleaning service providers.

Figure 4:
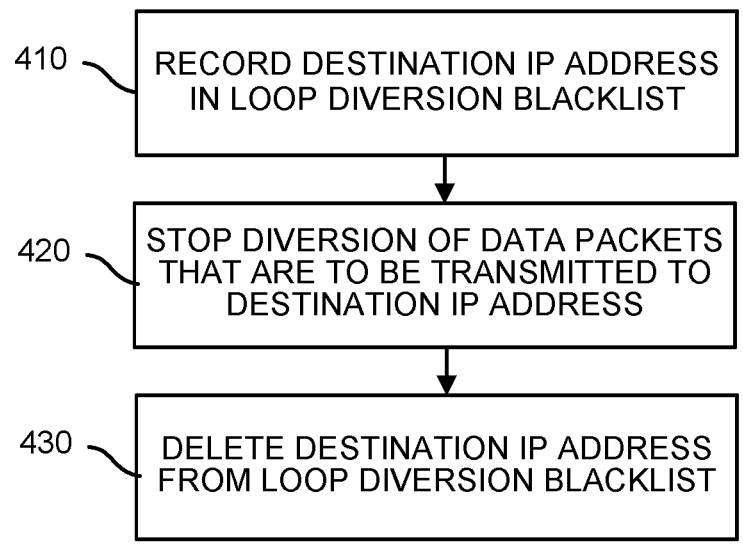
FIG. 4 is a schematic flow diagram of yet another embodiment of a process for identifying network loops.

FIG. 4 is a schematic flow diagram of yet another embodiment of a process for identifying network loops. In some embodiments, the process 400 is implemented by a traffic cleaning equipment 110 of FIG. 1A or a traffic cleaning equipment 150 of FIG.1B and comprises:

In 410, in the event that a network loop exists for the destination IP address, the traffic cleaning equipment records a destination IP address in a loop diversion blacklist.

In 420, the traffic cleaning equipment stops diversion of data packets that are to be transmitted to the destination IP address. In other words, when the traffic cleaning equipment stops the diversion of the data packets, the traffic cleaning equipment notifies the router to stop redirecting this IP flow to the traffic cleaning equipment.

In 430, after detecting that the network loop corresponding to the destination IP address has been repaired, the traffic cleaning equipment deletes the destination IP address from the loop diversion blacklist. As an example, one way to repair the network loop is to provide a corrected routing table.

In some embodiments, by recording the destination IP address in the loop diversion blacklist, after a destination IP address for which a network loop exists has been identified, stopping traffic diversion to the destination IP address is possible, thus avoiding a second diversion of the destination IP address. After detecting that the network loop corresponding to the destination IP address has been repaired, the destination IP address is deleted from the loop diversion blacklist, thereby allowing traffic to be able to reach the server corresponding to the destination IP address normally.

Figure 5A:
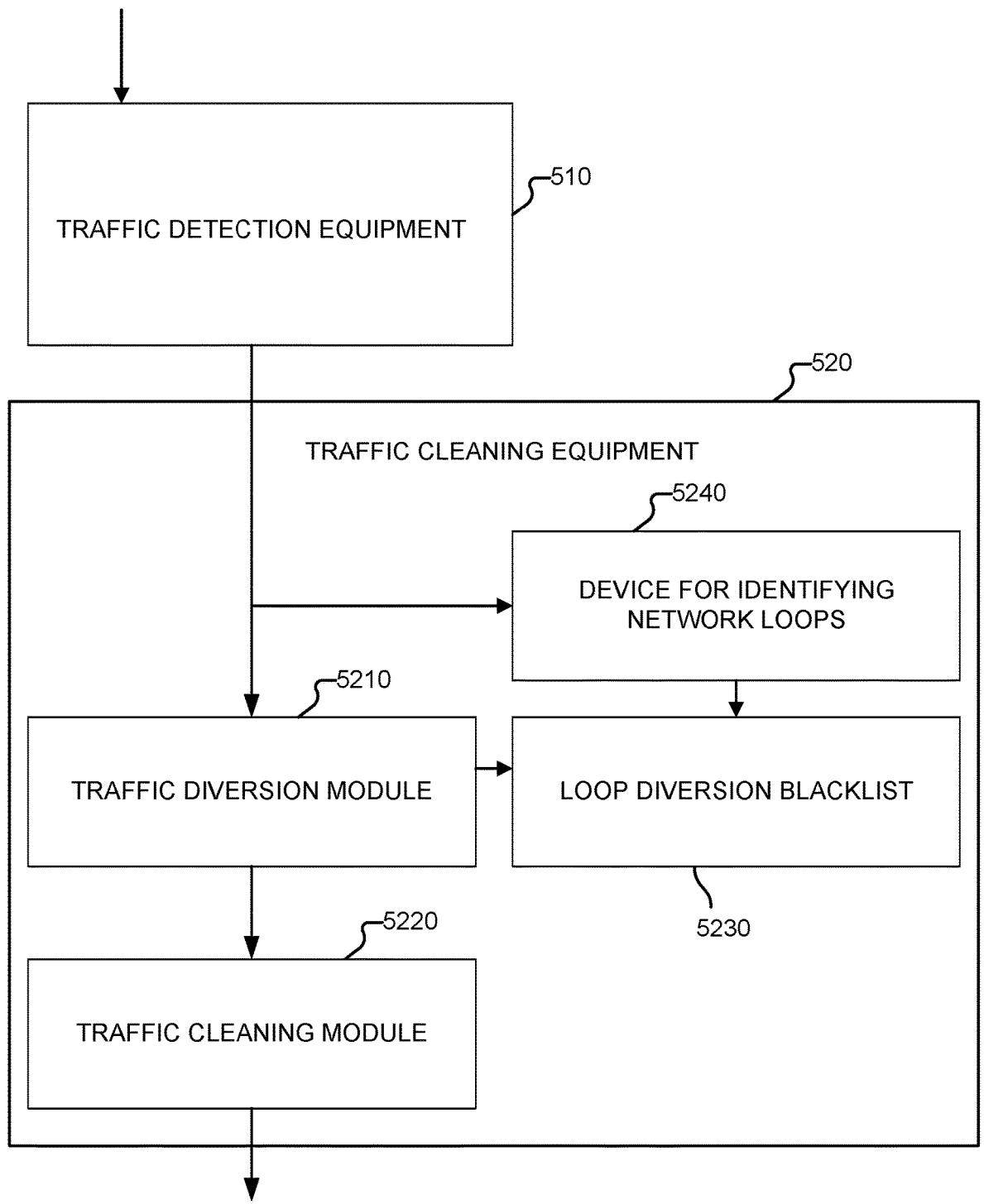
FIG. 5A is a structural schematic diagram of an embodiment of a system for cleaning traffic.

FIG. 5A is a structural schematic diagram of an embodiment of a system for cleaning traffic. In some embodiments, the system 500 is configured to implement process 400 of FIG. 4 and comprises: traffic detection equipment 510 and traffic cleaning equipment 520.

In some embodiments, the traffic detection equipment 510 is configured to detect data packets belonging to a category of attack traffic among network traffic mirrored by a router (e.g., router 130 of FIG. 1A or router 170 of FIG. 1B). There are many types of attack traffic. The attack traffic includes deformed packets, SYN flood, user datagram protocol (UDP) flood, domain name system (DNS) flood, etc. DDOS attacks try to cause traffic flow to exceed the normal range. In some embodiments, the network is mirrored because the router is deployed in an out-of-path mode, and if there is no data diversion, the router deployed in the out-of-path mode cannot see the traffic flow. Thus, when the network traffic is mirrored, the router can see the flow and perform an analysis on the network traffic to detect attack traffic.

In some embodiments, the traffic cleaning equipment 520 is configured to identify network loops using TTLs included in data packets belonging to the category of attack traffic according to the techniques described above, and stop cleaning network traffic of destination IP addresses for which network loops exist.

In some embodiments, identifying network loops using the TTLs included in the data packets thus enables the traffic cleaning equipment 520 to stop cleaning the network traffic of the destination IP addresses for which network loops exist. When a network loop is detected, the traffic cleaning equipment 520 instructs the router (in this case, the router is typically in an out-of-path mode) to stop diverting network traffic to the traffic cleaning equipment 520. As a result, the network traffic does not pass through the traffic cleaning equipment 520, and goes through another path.

In some embodiments, the network cleaning equipment 520 further comprises: a traffic diversion module 5210, a traffic cleaning module 5220, a loop diversion blacklist 5230, and a device for identifying network loops 5240.

In some embodiments, the traffic diversion module 5210 is configured to divert data packets coming from traffic detection equipment that belongs to the category of attack traffic to the traffic cleaning module 5220.

In some embodiments, the traffic cleaning module 5220 is configured to inquire whether a destination IP address of a data packet belonging to the category of attack traffic is stored in the loop diversion blacklist 5230, and in the event that a network loop exists for the destination IP address, stop diversion of the destination IP address to the router. In some embodiments, the loop diversion blacklist 5230 stores destination IP addresses where network loops exist.

In some embodiments, the device for identifying network loops 5240 is configured to identify a first data packet having a TTL that is less than a first preset threshold value or at least meets a first condition from among data packets belonging to the category of attack traffic; determine the destination IP address of the first data packet; within a first set time period after determining the destination IP address of the first data packet, determine multiple second data packets received that are to be transmitted to the destination IP address; and based on the TTLs of the multiple second data packets, determine whether a network loop exists for the destination IP address.

In some embodiments, the loop diversion blacklist 5230 stores destination IP addresses for which network loops exist.

Figure 7:
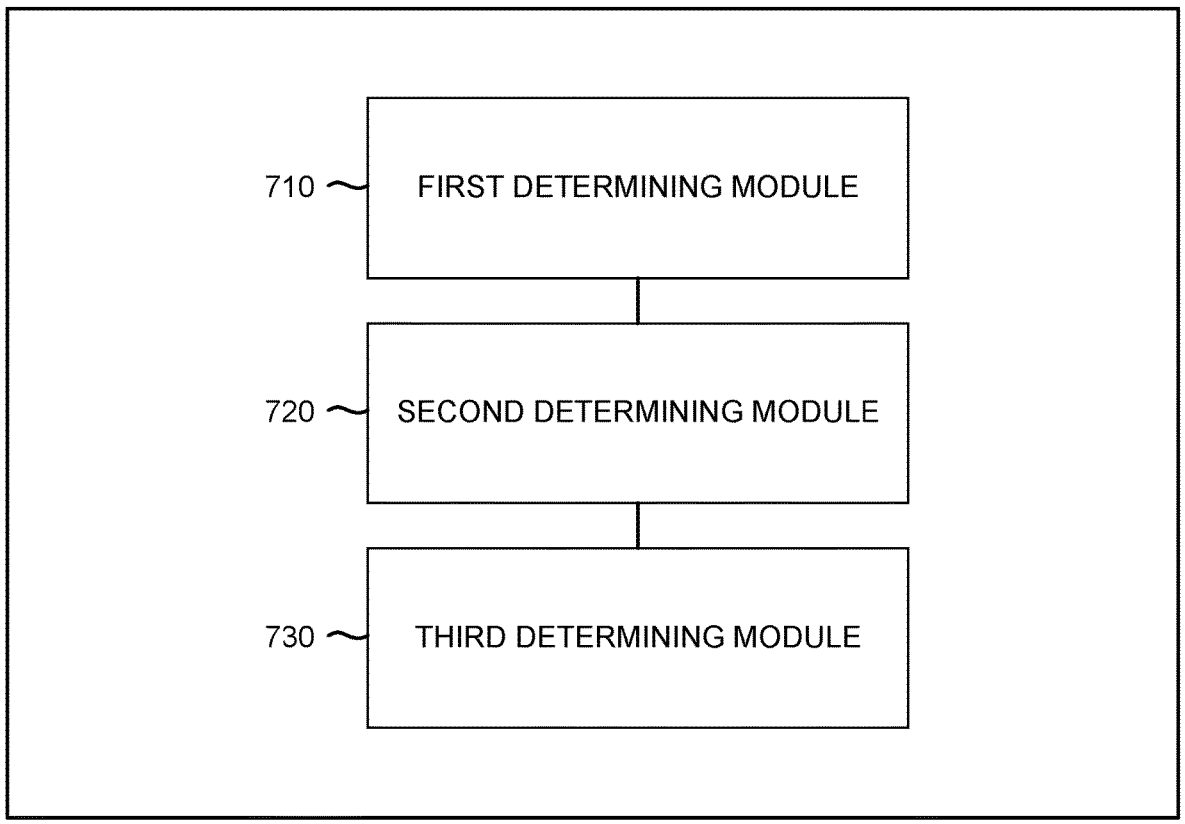
FIG. 7 is a structural schematic diagram of an embodiment of a device for identifying network loops.
Figure 8:
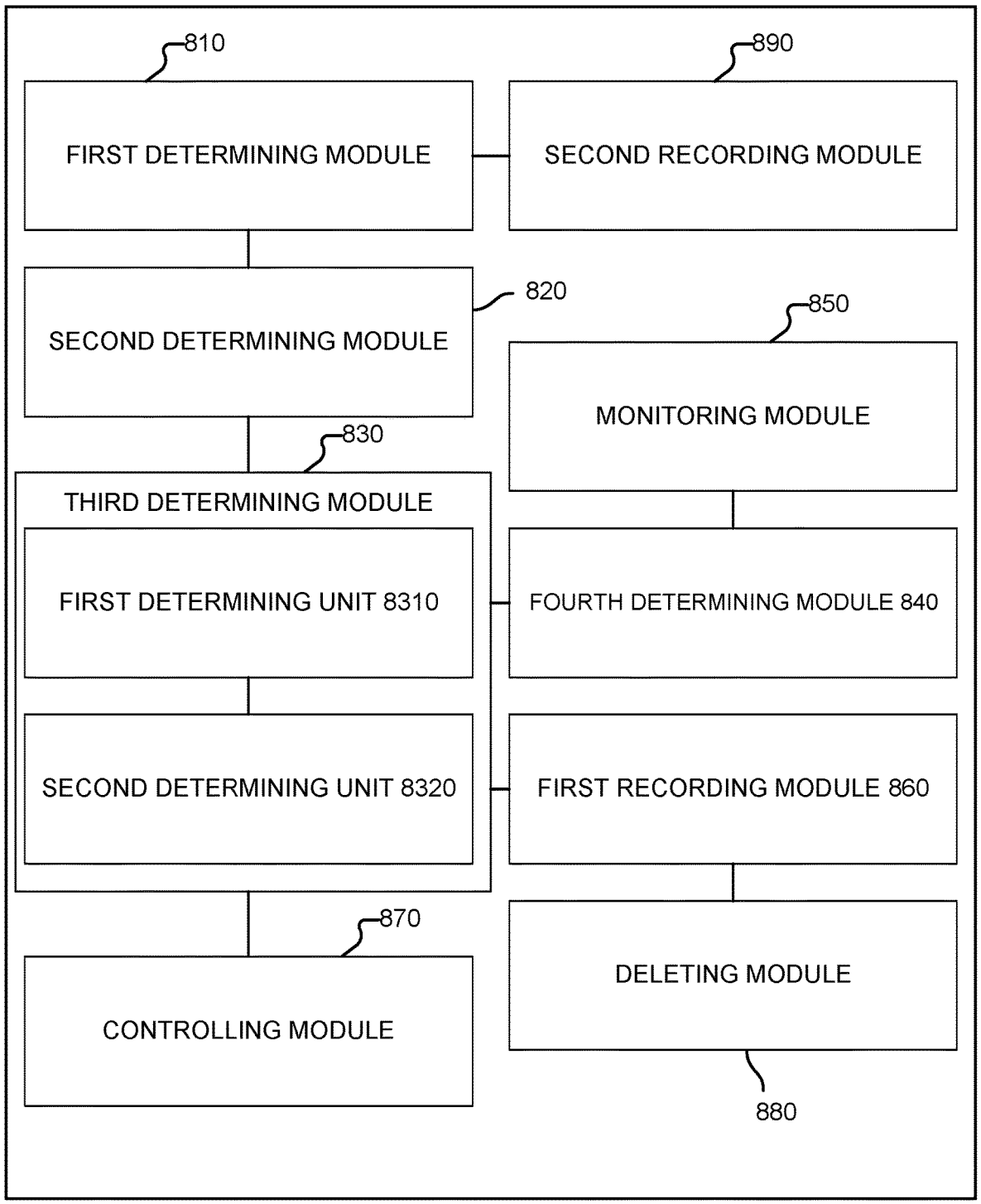
FIG. 8 is a structural schematic diagram of another embodiment of a device for identifying network loops.

The device for identifying network loops 5240 can be a device for identifying network loops 800 of FIG. 8 or a device for identifying network loops 700 of FIG. 7. Therefore, the device for identifying network loops 5240 will not be further described for conciseness.

Figure 5B:
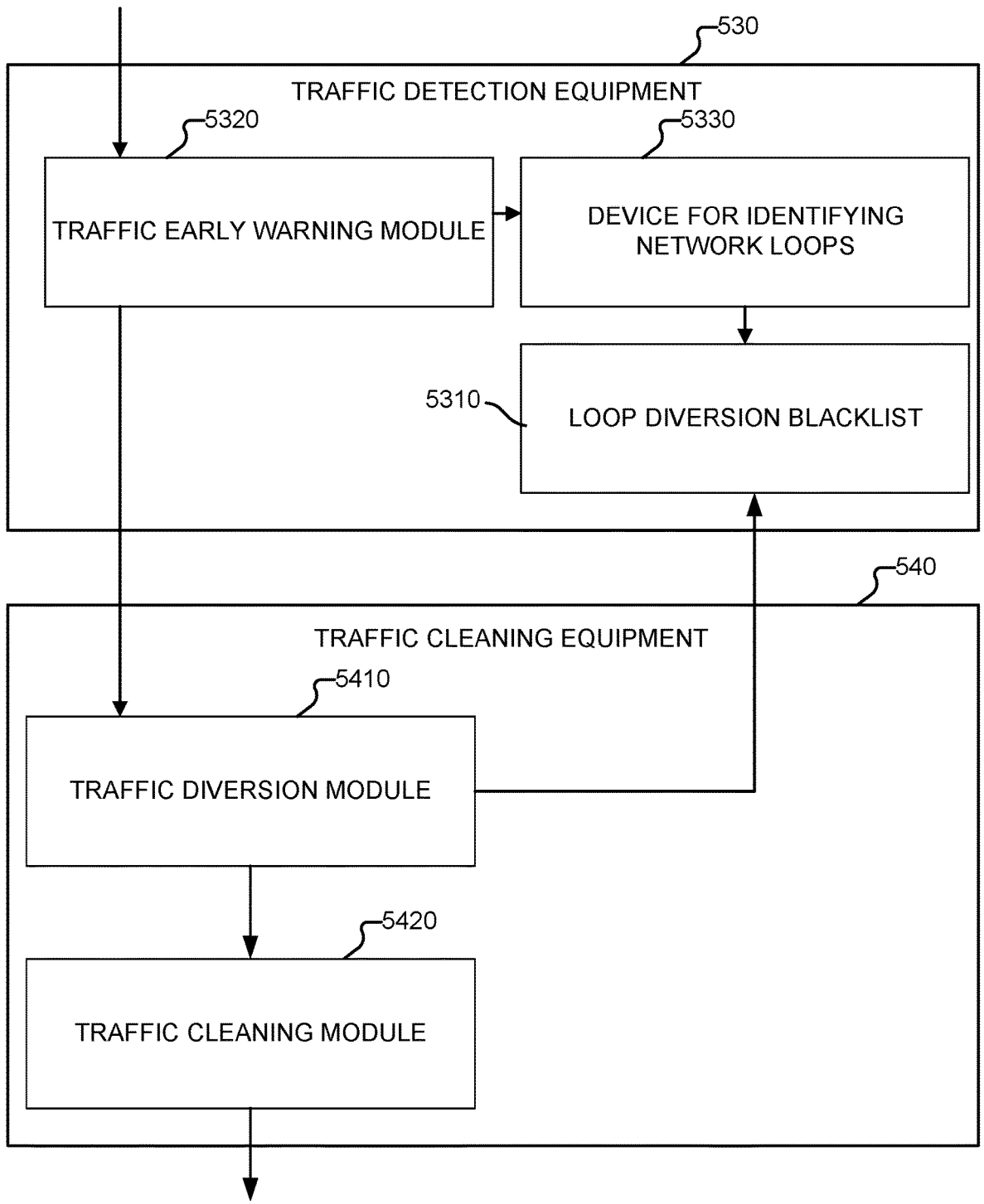
FIG. 5B is a structural schematic diagram of another embodiment of a system for cleaning traffic.

FIG. 5B is a structural schematic diagram of another embodiment of a system for cleaning traffic. In some embodiments, the system 550 is configured to implement process 400 of FIG. 4 and comprises: traffic detection equipment 530 and traffic cleaning equipment 540.

In some embodiments, the traffic detection equipment 530 is configured to detect data packets belonging to a category of attack traffic included in the network traffic mirrored by a router (e.g., router 130 of FIG. 1A or router 170 of FIG. 1B), and identify network loops using TTLs included in the data packets belonging to the category of attack traffic.

In some embodiments, the traffic cleaning equipment 540 is configured to, after determining that a network loop exists for the destination IP address of a data packet belonging to the category of attack traffic, stop cleaning the network traffic of destination IP addresses for which network loops exist.

In some embodiments, the traffic detection equipment 530 comprises: a loop diversion blacklist 5310, a traffic early warning module 5320, and a device for identifying network loops 5330.

In some embodiments, the traffic early warning module 5320 is configured to detect data packets belonging to the category of attack traffic among the network traffic mirrored by the router.

In some embodiments, the device for identifying network loops 5330 is configured to determine a first data packet having a TTL that is less than a first preset threshold value or at least meets a first condition from among data packets belonging to the category of attack traffic, and determine the destination IP address of the first data packet; within a first set time period after determining the destination IP address of the first data packet, determine multiple second data packets received that are to be transmitted to the destination IP address; and based on the TTLs of the multiple second data packets, determine whether a network loop exists for the destination IP address. In some embodiments, destination IP addresses for which network loops exist are recorded in the loop diversion blacklist 5310. When an out-of-path packet diversion command is issued, traffic destined for IP addresses in the loop diversion blacklist 5310 are not to be diverted, thus avoiding a network loop. Because the reason for the network loop is that the traffic cleaning equipment diverts traffic destined for an IP address and then injects the traffic destined for the IP address again into the network traffic, thus, after traffic destined for the IP address is determined to be on the blacklist, the traffic destined for the blacklisted IP address is not to be diverted again.

The device for identifying network loops 5330 can correspond to a device for identifying network loops 800 of FIG. 8 or a device for identifying network loops 700 of FIG. 7. The device for identifying network loops 5330 will not be further described here for conciseness.

In some embodiments, the traffic cleaning equipment 540 comprises: a traffic diversion module 5410 and a traffic cleaning module 5420.

In some embodiments, the traffic diversion module 5410 is configured to divert data packets coming from the traffic detection equipment that belong to the category of attack traffic to the traffic cleaning module 5420.

In some embodiments, the traffic cleaning module 5420 is configured to inquire whether a destination IP address of a data packet belonging to the category of attack traffic is stored in the loop diversion blacklist 5310, and in the event that a network loop exists for the destination IP address, stop diversion of the destination IP address to the router. In some embodiments, the loop diversion blacklist 5310 stores destination IP addresses for which network loops exist.

The above description illustrates that relative to conventional linkages of DDoS equipment, including DDoS attack early warnings, DDoS traffic diversion management, and DDoS traffic cleaning, identification of destination IP addresses for which network loops exist based on changes in the TTLs of the diverted data packets is performed, thereby detecting network loops at the traffic cleaning equipment layer and performing automatic stoppage of bypass BGP routing diversion, thereby discovering and resolving the problem of loops, so that a scheme of bypass diversion and cleaning near the source is assured.

Figure 6:
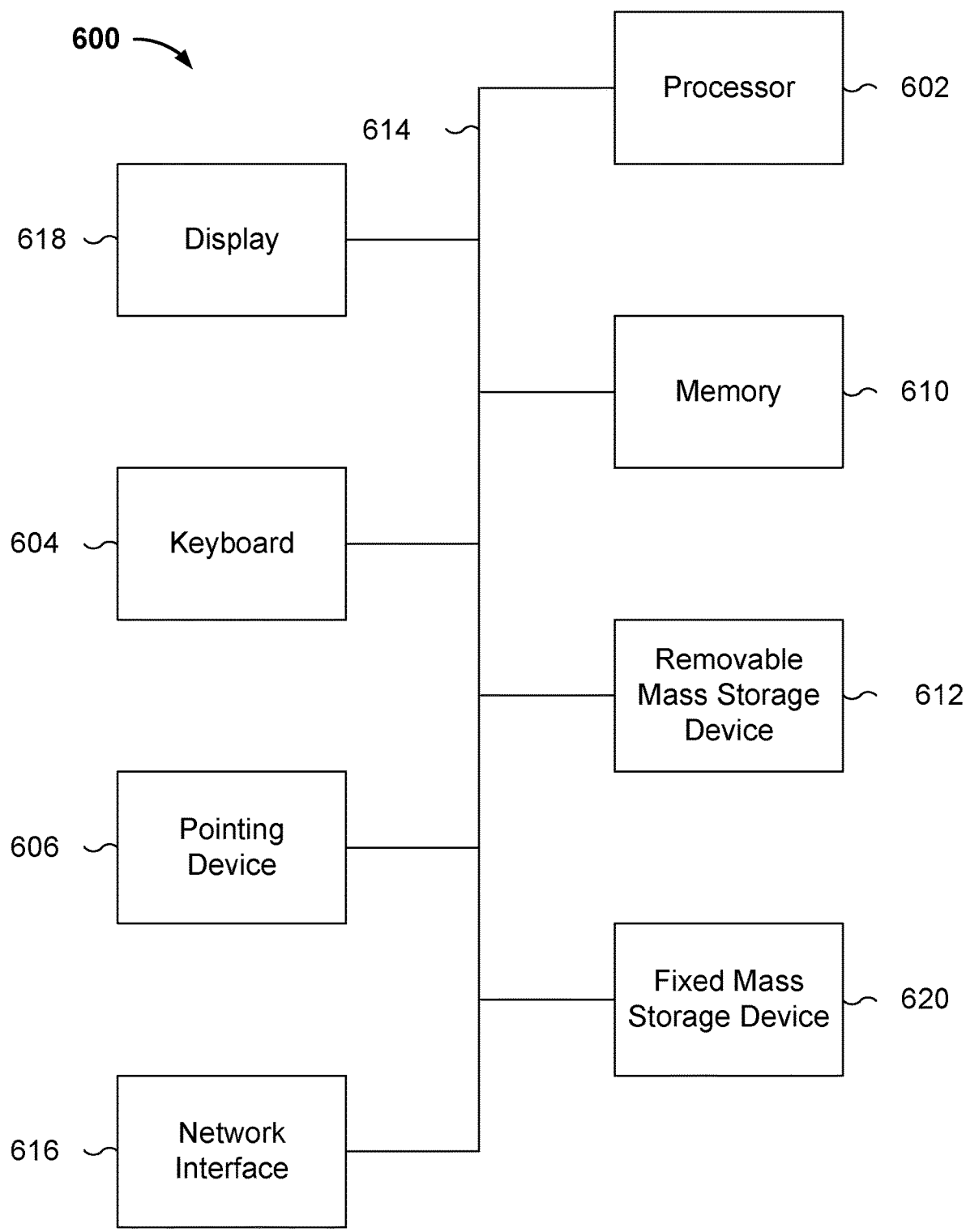
FIG. 6 is a functional diagram illustrating a programmed computer system for identifying network loops.

FIG. 6 is a functional diagram illustrating a programmed computer system for identifying network loops. As will be apparent, other computer system architectures and configurations can be used to identify network loops. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storages 612 and 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

FIG. 7 is a structural schematic diagram of an embodiment of a device for identifying network loops. In some embodiments, the device 700 is configured to implement process 200 and comprises: a first determining module 710, a second determining module 720, and a third determining module 730.

In some embodiments, the first determining module 710 is configured to determine a first data packet having a TTL that is less than a first preset threshold value or at least meets a first condition from among diverted network traffic, and determine the destination IP address of the first data packet.

In some embodiments, the second determining module 720 is configured to, within a first set time period after determining the destination IP address of the first data packet, determine multiple second data packets received that are to be transmitted to the destination IP address.

In some embodiments, the third determining module 730 is configured to determine whether a network loop exists for the destination IP address based on TTLs of the multiple second data packets.

FIG. 8 is a structural schematic diagram of another embodiment of a device for identifying network loops. In some embodiments, the device 800 is configured to implement process 300 of FIG. 3 and comprises: a first determining module 810, a second determining module 820, and a third determining module 830.

In some embodiments, the first determining module 810 corresponds to the first determining module 710 of FIG. 7.

In some embodiments, the second determining module 820 corresponds to the second determining module 720 of FIG. 7.

In some embodiments, the third determining module 830 further comprises: a first determining unit 8310 and a second determining unit 8320.

In some embodiments, the first determining unit 8310 is configured to determine whether a set number of TTLs that are reduced to a second preset threshold value exists in the multiple TTLs corresponding to the multiple second data packets determined within the first set time period.

In some embodiments, the second determining unit 8320 is configured to, in the event that the set number of TTLs that are reduced to the second preset threshold value exists among the multiple TTLs corresponding to the multiple second data packets, determine that a network loop exists for the destination IP address.

In some embodiments, the device 800 further comprises: a fourth determining module 840, a monitoring module 850, a first recording module 860, a controlling module 870, a deleting module 880, and a second recording module 890.

In some embodiments, the fourth determining module 840 is configured to, in the event that the set number of TTLs that are reduced to a second preset threshold value does not exist, determine that a network loop does not exist for the destination IP address.

In some embodiments, the monitoring module 850 is configured to, within a second set time period after determining that a network loop does not exist for the destination IP address, continue to monitor data packets coming from the destination IP address.

In some embodiments, the first recording module 860 is configured to, in the event that a determination is made that a network loop exists for the destination IP address, record the destination IP address in a loop diversion blacklist.

In some embodiments, the controlling module 870 is configured to, after determining that a network loop exists for the destination IP address, stop diverting data packets that are to be transmitted to the destination IP address.

In some embodiments, the deleting module 880 is configured to, after determining that the network loop corresponding to a destination IP address has been repaired, delete the destination IP address from the loop diversion blacklist.

In some embodiments, the second recording module 890 is configured to record the destination IP address of the first data packet.

The identification of the occurrence of network loops in destination IP addresses based on changes in the TTLs of diverted data packets is performed, thereby implementing network loop detection at a traffic cleaning equipment layer and automatic stoppage of bypass BGP routing diversion, thus discovering and resolving the problem of network loops so that a scheme of bypass diversion and cleaning near the source occurs.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules or units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
determining that a first data packet has a time to live (TTL) that at least meets a first condition, the first data packet having a destination internet protocol (IP) address, comprising:
comparing the TTL of the first data packet with a first preset threshold value; and
in response to a comparison result that the TTL of the first data packet does not exceed the first preset threshold value, determining that the first data packet has a TTL that at least meets the first condition;
within a time period after the determining of the first data packet having a TTL that at least meets the first condition, identifying a plurality of second data packets that are to be transmitted to the same destination IP address as the first data packet; and
determining whether a network loop exists for the destination IP address based on TTLs of the plurality of second data packets, comprising:
determining whether a TTL of a second data packet at least meets a second condition, comprising:
comparing the TTL of the second data packet with a second preset threshold value, wherein the second preset threshold value is lower than the first preset threshold value; and
in response to a comparison result that the TTL of the second data packet does not exceed the second preset threshold value, determining that the TTL of the second data packet at least meets the second condition; and
in response to a determination that the TTL of the second data packet at least meets the second condition, determining that the network loop exists for the destination IP address, comprising:
determining whether a first sequence number of the second data packet matches a second sequence number of another second data packet; and
in response to determination that the first sequence number matches the second sequence number, omitting a determination that the network loop exists; and
in response to a determination that the network loop exists for the destination IP address:
recording the destination IP address in a loop diversion blacklist; and
stopping diversion of data packets in the network traffic that are to be transmitted to the destination IP address.

2. A method as described in claim 1, wherein:
the method further comprises:
in response to a determination that the TTL of the second data packet fails to satisfy the second condition:
determining that the network loop does not exist in the destination IP address; and
for a second set time period, continuing to monitor data packets coming from the destination IP address.

3. A method as described in claim 1, further comprising:
determining whether the network loop corresponding to the destination IP address has been repaired; and
in response to a determination that the network loop corresponding to the destination IP address has been repaired, deleting the destination IP address from the loop diversion blacklist.

4. A method as described in claim 1, further comprising:
recording the destination IP address of the first data packet in an IP address list configured to monitor network loops.

5. A method as described in claim 1, wherein:
the first data packet is obtained from diverted network traffic; and
the plurality of second data packets are obtained from the diverted network traffic.

6. A device, comprising:
a processor; and
a memory coupled with the processor, wherein the memory is configured to provide the processor with instructions which when executed cause the processor to:
determine that a first data packet has a time to live (TTL) that at least meets a first condition, the first data packet having a destination internet protocol (IP) address, comprising to:
compare the TTL of the first data packet with a first preset threshold value; and
in response to a comparison result that the TTL of the first data packet does not exceed the first preset threshold value, determine that the first data packet has a TTL that at least meets the first condition;
within a time period after the determining of the first data packet having a TTL that at least meets the first condition, identify a plurality of second data packets that are to be transmitted to the same destination IP address as the first data packet; and
determine whether a network loop exists for the destination IP address based on TTLs of the plurality of second data packets, comprising to:
determine whether a TTL of a second data packet at least meets a second condition, comprising to:
compare the TTL of the second data packet with a second preset threshold value, wherein the second preset threshold value is lower than the first preset threshold value; and
in response to a comparison result that the TTL of the second data packet does not exceed the second preset threshold value, determine that the TTL of the second data packet at least meets the second condition; and
in response to a determination that the TTL of the second data packet at least meets the second condition, determine that the network loop exists for the destination IP address, comprising to:
determine whether a first sequence number of the second data packet matches a second sequence number of another second data packet; and
in response to determination that the first sequence number matches the second sequence number, omit a determination that the network loop exists; and
in response to a determination that the network loop exists for the destination IP address:
record the destination IP address in a loop diversion blacklist; and
stop diversion of data packets in the network traffic that are to be transmitted to the destination IP address.

7. A device as described in claim 6, wherein:
the processor is further configured to:
in response to a determination that the TTL of the second data packet fails to satisfy the second condition:
determine that the network loop does not exist in the destination IP address; and
for a second set time period, continue to monitor data packets coming from the destination IP address.

8. A device as described in claim 6, the processor is further configured to:
determine whether the network loop corresponding to the destination IP address has been repaired; and
in response to a determination that the network loop corresponding to the destination IP address has been repaired, delete the destination IP address from the loop diversion blacklist.

9. A device as described in claim 6, wherein the processor is further configured to:
record the destination IP address of the first data packet in an IP address list used to monitor network loops.

10. A device as described in claim 6, wherein:
the first data packet is obtained from diverted network traffic; and
the plurality of second data packets are obtained from the diverted network traffic.

11. A computer program product being embodied in a tangible non-transitory computer readable storage medium and comprising computer instructions for:
determining that a first data packet has a time to live (TTL) that at least meets a first condition, the first data packet having a destination internet protocol (IP) address, comprising:
comparing the TTL of the first data packet with a first preset threshold value; and
in response to a comparison result that the TTL of the first data packet does not exceed the first preset threshold value, determining that the first data packet has a TTL that at least meets the first condition;
within a time period after the determining of the first data packet having a TTL that at least meets the first condition, identifying a plurality of second data packets that are to be transmitted to the same destination IP address as the first data packet; and
determining whether a network loop exists for the destination IP address based on TTLs of the plurality of second data packets, comprising:
determining whether a TTL of a second data packet at least meets a second condition, comprising:
comparing the TTL of the second data packet does not exceed a second preset threshold value, wherein the second preset threshold value is lower than the first preset threshold value; and
in response to a comparison result that the TTL of the second data packet does not exceed the second preset threshold value, determining that the TTL of the second data packet at least meets the second condition; and
in response to a determination that the TTL of the second data packet at least meets the second condition, determining that the network loop exists for the destination IP address, comprising:
determining whether a first sequence number of the second data packet matches a second sequence number of another second data packet; and
in response to determination that the first sequence number matches the second sequence number, omitting a determination that the network loop exists; and
in response to a determination that the network loop exists for the destination IP address:
recording the destination IP address in a loop diversion blacklist; and
stopping diversion of data packets in the network traffic that are to be transmitted to the destination IP address.

12. A method, comprising:
detecting data packets belonging to a category of attack traffic included in network traffic mirrored by a router;
identifying a network loop using time-to-lives (TTLs) included in the data packets belonging to the category of attack traffic, the network loop being associated with an IP address, wherein the identifying of the network loop comprises:
determining that a first data packet has a TTL that at least meets a first condition, the first data packet having a destination internet protocol (IP) address, comprising:
comparing the TTL of the first data packet with a first preset threshold value; and
in response to a determination that the TTL of the first data packet does not exceed the first preset threshold value, determining that the first data packet has a TTL that at least meets the first condition;
within a time period after the determining of the first data packet having a TTL that at least meets the first condition, identifying a plurality of second data packets that are to be transmitted to the same destination IP address as the first data packet; and
determining whether a network loop exists for the destination IP address based on TTLs of the plurality of second data packets, comprising:
determining whether a TTL of a second data packet at least meets a second condition, comprising:
comparing the TTL of the second data packet with a second preset threshold value, wherein the second preset threshold value is lower than the first preset threshold value; and
in response to a comparison result that the TTL of the second data packet does not exceed the second preset threshold value, determining that the TTL of the second data packet at least meets the second condition; and
in response to a determination that the TTL of the second data packet at least meets the second condition, determining that the network loop exists, comprising to:
determining whether a first sequence number of the second data packet matches a second sequence number of another second data packet; and
in response to determination that the first sequence number matches the second sequence number, omitting a determination that the network loop exists; and
ceasing to clean network traffic destined for the IP address associated with the network loop.

13. The method as described in claim 12, further comprising:
diverting the data packets belonging to the category of attack traffic;

determining whether a destination IP address of a data packet belonging to the category of attack traffic is recorded in a loop diversion blacklist, the loop diversion blacklist storing IP addresses for which network loops exist; and in response to a determination that the network loop exists for the destination IP address, ceasing to divert the destination IP address to the router.

14. A system, comprising:

a processor; and a memory coupled with the processor, wherein the memory is configured to provide the processor with instructions which when executed cause the processor to:

detect data packets belonging to a category of attack traffic included in network traffic mirrored by a router;

identify a network loop using time-to-lives (TTLs) included in the data packets belonging to the category of attack traffic, the network loop being associated with an IP address, wherein to identify the network loop comprises to:

determine that a first data packet has a TTL that at least meets a first condition, the first data packet having a destination internet protocol (IP) address, comprising to:

compare the TTL of the first data packet with a first preset threshold value; and in response to a comparison result that the TTL of the first data packet does not exceed the first preset threshold value, determine that the first data packet has a TTL that at least meets the first condition;

within a time period after the determining of the first data packet having a TTL that at least meets the first condition, identify a plurality of second data packets that are to be transmitted to the same destination IP address as the first data packet; and determine whether a network loop exists for the destination IP address based on TTLs of the plurality of second data packets, comprising to:

determine whether a TTL of a second data packet at least meets a second condition, comprising to:

compare the TTL of the second data packet with a second preset threshold value, wherein the second preset threshold value is lower than the first preset threshold value; and in response to a comparison result that the TTL of the second data packet does not exceed the second preset threshold value, determine that the TTL of the second data packet at least meets the second condition; and in response to a determination that the TTL of the second data packet at least meets the second condition, determine that the network loop exists, comprising to:

determine whether a first sequence number of the second data packet matches a second sequence number of another second data packet; and in response to determination that the first sequence number matches the second sequence number, omit a determination that the network loop exists; and cease to clean network traffic destined for the IP address associated with the network loop.

15. A system as described in claim 14, wherein the instructions further cause the processor to:

divert the data packets belonging to the category of attack traffic;

determine whether a destination IP address of a data packet belonging to the category of attack traffic is recorded in a loop diversion blacklist, the loop diversion blacklist storing IP addresses for which network loops exist; and in response to a determination that the network loop exists for the destination IP address, cease to divert the destination IP address to the router.

16. A computer program product being embodied in a tangible non-transitory computer readable storage medium and comprising computer instructions for:

detecting data packets belonging to a category of attack traffic included in network traffic mirrored by a router;

identifying a network loop using time-to-lives (TTLs) included in the data packets belonging to the category of attack traffic, the network loop being associated with an IP address, wherein the identifying of the network loop comprises:

determining that a first data packet has a TTL that at least meets a first condition, the first data packet having a destination internet protocol (IP) address, comprising:

comparing the TTL of the first data packet with a first preset threshold value; and in response to a comparison result that the TTL of the first data packet does not exceed the first preset threshold value, determining that the first data packet has a TTL that at least meets the first condition;

within a time period after the determining of the first data packet having a TTL that at least meets the first condition, identifying a plurality of second data packets that are to be transmitted to the same destination IP address as the first data packet; and determining whether a network loop exists for the destination IP address based on TTLs of the plurality of second data packets, comprising:

determining whether a TTL of a second data packet at least meets a second condition, comprising:

comparing the TTL of the second data packet with a second preset threshold value, wherein the second preset threshold value is lower than the first preset threshold value; and in response to a comparison result that the TTL of the second data packet does not exceed the second preset threshold value, determining that the TTL of the second data packet at least meets the second condition; and in response to a determination that the TTL of the second data packet at least meets the second condition, determining that the network loop exists comprising:

determining whether a first sequence number of the second data packet matches a second sequence number of another second data packet; and in response to determination that the first sequence number matches the second sequence number, omitting a determination that the network loop exists; and ceasing to clean network traffic destined for the IP address associated with the network loop.

* * * * *